United States Patent
Kim

(10) Patent No.: US 9,356,263 B2
(45) Date of Patent: May 31, 2016

(54) LITHIUM SECONDARY BATTERY INCLUDING A GASKET HAVING AN ADHESIVE LAYER

(75) Inventor: Daekyu Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1042 days.

(21) Appl. No.: 13/137,900

(22) Filed: Sep. 21, 2011

(65) Prior Publication Data

US 2012/0219849 A1    Aug. 30, 2012

(30) Foreign Application Priority Data

Feb. 28, 2011  (KR) .................. 10-2011-0017598

(51) Int. Cl.
- *H01M 2/08* (2006.01)
- *H01M 2/02* (2006.01)
- *H01M 10/04* (2006.01)

(52) U.S. Cl.
CPC ............. *H01M 2/08* (2013.01); *H01M 2/022* (2013.01); *H01M 10/0431* (2013.01)

(58) Field of Classification Search
CPC ... H01M 2/022; H01M 2/08; H01M 10/0422; H01M 10/0431; Y02E 60/12
USPC .................. 429/174, 164, 166, 185, 175, 176
See application file for complete search history.

(56) References Cited

U.S. PATENT DOCUMENTS

| | | | | |
|---|---|---|---|---|
| 3,460,951 A | * | 8/1969 | Heyl | 426/407 |
| 6,326,099 B1 | * | 12/2001 | Schubert | 429/54 |
| 2004/0013946 A1 | * | 1/2004 | Abe et al. | 429/326 |
| 2007/0015046 A1 | | 1/2007 | Kim et al. | |
| 2007/0154781 A1 | | 7/2007 | Choi | |
| 2011/0008672 A1 | | 1/2011 | Kim | |

FOREIGN PATENT DOCUMENTS

| | | |
|---|---|---|
| JP | 2003-151518 A | 5/2003 |
| JP | 2011-018631 A | 1/2011 |
| KR | 10-2007-0007537 A | 1/2007 |
| KR | 10-2007-0071235 A | 7/2007 |
| KR | 10-2009-0027316 A | 3/2009 |

OTHER PUBLICATIONS

Korean Notice of Allowance dated Oct. 26, 2012.

* cited by examiner

*Primary Examiner* — Raymond Alejandro
(74) *Attorney, Agent, or Firm* — Lee & Morse, P.C.

(57) ABSTRACT

A cylinder type lithium secondary battery may include an electrode assembly, a cylindrical can configured to retain the electrode assembly, a cap assembly coupled to a top opening of the cylindrical can, an electrolyte disposed in the cylindrical can, and a gasket between the cap assembly and the cylindrical can, the gasket including an adhesive layer having a reaction product of the electrolyte and a material of the gasket.

12 Claims, 4 Drawing Sheets

LITHIUM SECONDARY BATTERY INCLUDING A GASKET HAVING AN ADHESIVE LAYER

BACKGROUND

1. Field

Embodiments relate to a cylinder type lithium secondary battery.

2. Description of the Related Art

A lithium secondary battery includes an electrode plate assembly, a can, a cap assembly, and an electrolyte. The electrode plate assembly includes a positive electrode plate, a negative electrode plate and a separator wound together, the positive electrode plate coated with a positive electrode plate active material, the negative electrode plate coated with a negative electrode plate active material, and the separator disposed between the positive and negative electrode plates to prevent electrical short while allowing lithium ions to move. The can, e.g., a cylindrical can, accommodates the electrode plate assembly. The cap assembly seals a top portion of the can. The electrolyte is injected into the can. In addition, the lithium secondary battery includes a gasket inserted between the cap assembly and the can to seal a gap between the cap assembly and the can.

SUMMARY

Embodiments are therefore directed to a cylinder type lithium secondary battery, which substantially overcomes one or more of the problems due to the limitations and disadvantages of the related art.

It is therefore a feature of an embodiment to provide a cylinder type lithium secondary battery with improved sealing capacity.

It is therefore another feature of an embodiment to prevent leakage of electrolyte between the cap assembly and the gasket or between the gasket and the cylinder can.

According to an embodiment, a cylinder type lithium secondary battery is provided. The cylinder type lithium secondary battery may include an electrode assembly, a cylindrical can configured to retain the electrode assembly, a cap assembly coupled to a top opening of the cylindrical can, an electrolyte disposed in the cylindrical can, and a gasket between the cap assembly and the cylindrical can. The gasket may include an adhesive layer having a reaction product of the electrolyte and a material of the gasket.

The gasket may include oriented polystyrene (OPS). The gasket may include a top portion positioned between the cap assembly and the inner wall of the cylindrical can, a mid portion horizontally extending from a lower end of the top portion, the mid portion having a top surface contacting a bottom edge of the cap assembly seated thereon, and a bottom portion extending from a lower end of the mid portion. The top portion, the mid portion and the bottom portion of the gasket may include OPS. The portion of the gasket contacting the electrolyte may include the bottom portion and a first portion of the mid portion of the gasket. The portion of the gasket not contacting the electrolyte may include a top portion and second portion of the mid portion of the gasket. The electrolyte may contact the bottom and side surfaces of the cap assembly or the inner wall of the cylindrical can and a beading part. A portion of the gasket contacting the electrolyte may include OPS, and a portion of the gasket not contacting the electrolyte may include polypropylene. In addition, the gasket may have a body including polypropylene, and a coating layer including OPS disposed on a surface of the body.

In addition, the electrolyte may contact a surface of the gasket. The gasket may have a sealing pressure of about 23.00 kgf/cm² or higher. The gasket may have a sealing pressure of about 29.00 kgf/cm². The electrolyte may include dimethyl carbonate (DMC), diethyl carbonate (DEC) or dipropyl carbonate (DPC). The gasket may be configured to support the cap assembly in the cylindrical can. An entire thickness of the gasket may include the adhesive layer.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
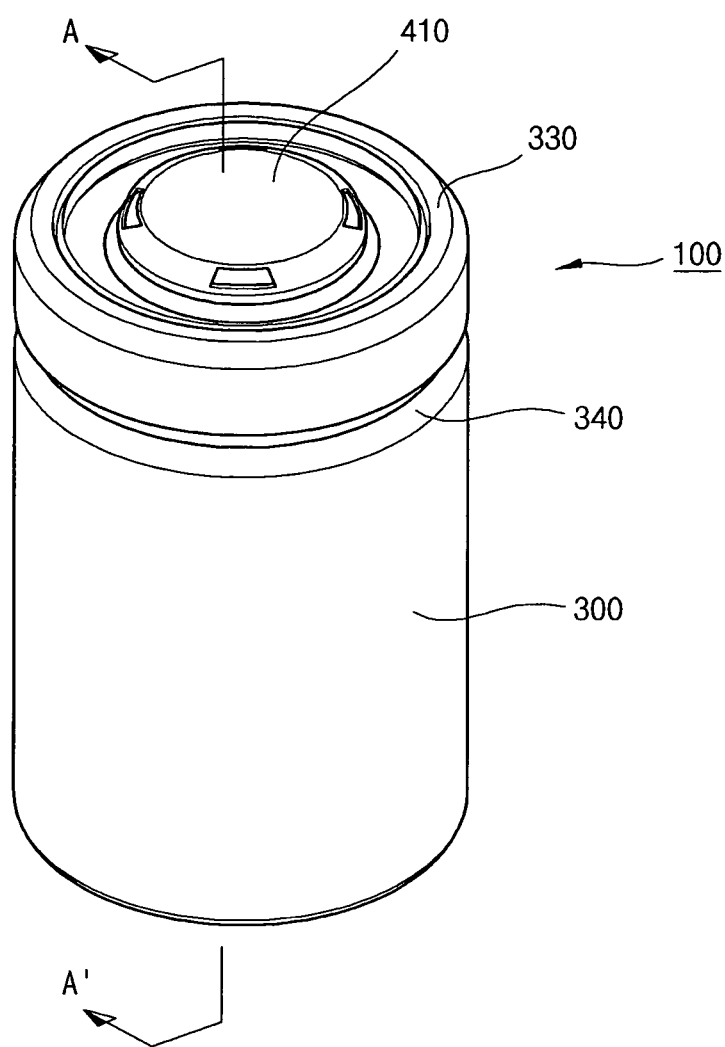
FIG. 1 illustrates a perspective view of a cylinder type lithium secondary battery according to an embodiment.

Korean Patent Application No. 10-2011-0017598, filed on Feb. 28, 2011, in the Korean Intellectual Property Office, and entitled: "Cylinder Type Lithium Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a cylinder type lithium secondary battery according to an embodiment will be described in detail with reference to the accompanying drawings.

Figure 2:
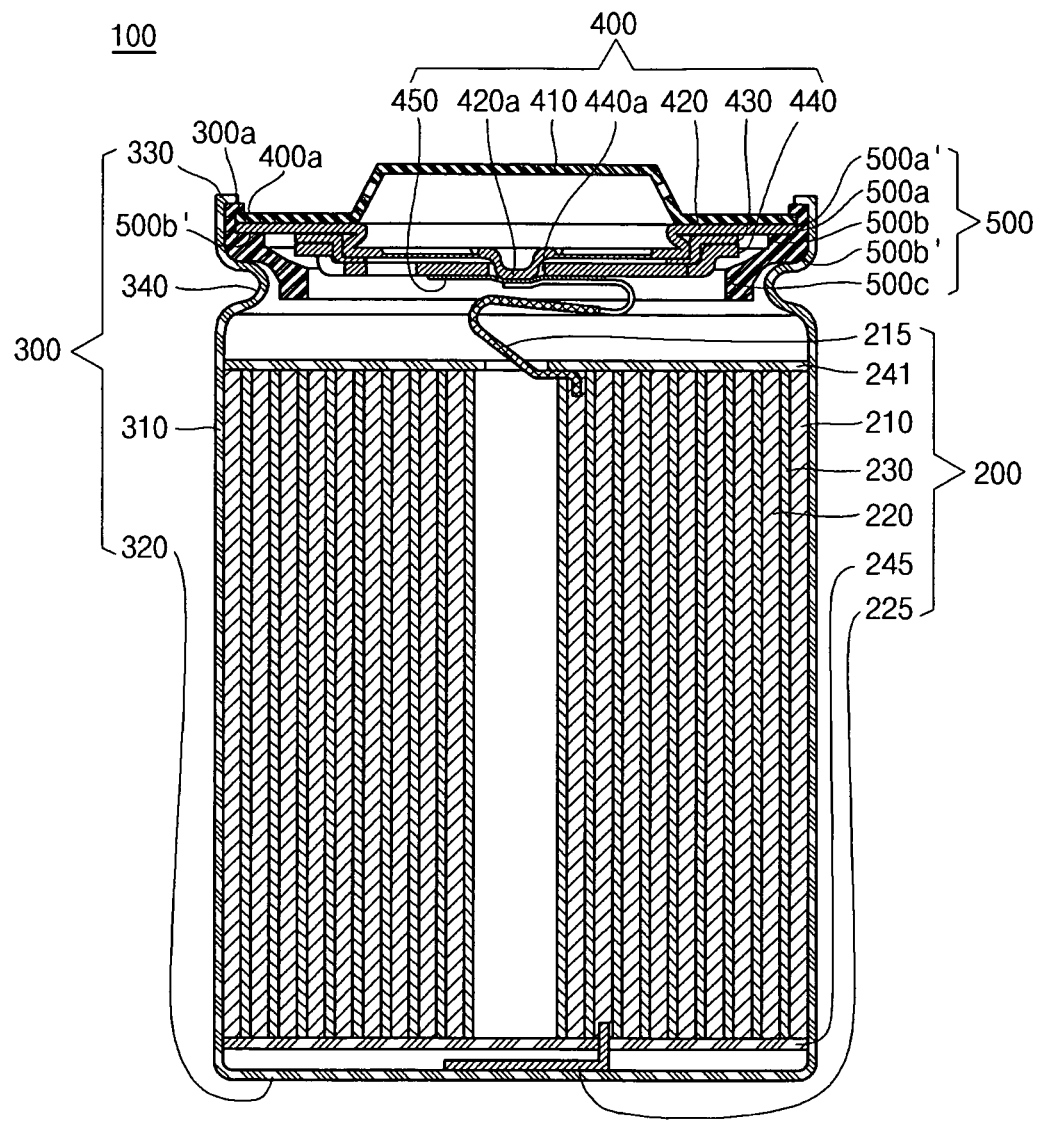
FIG. 2 illustrates a vertical sectional view taken along the line A-A' of FIG. 1.

FIG. 1 is a perspective view of a cylinder type lithium secondary battery according to an embodiment. FIG. 2 is a vertical sectional view taken along the line A-A' of FIG. 1.

Referring to FIGS. 1 and 2, the cylinder type lithium secondary battery 100 may include a cylindrical can 300, a cap assembly 400, and a gasket 500. The cap assembly 400 may be coupled to a top portion of the cylindrical can 300.

Referring to FIG. 2, an electrode assembly 200 and an electrolyte may be inserted or disposed in the cylindrical can 300 in the cylinder type lithium secondary battery 100. The cap assembly 400 may be assembled with or coupled to a top portion of the cylindrical can 300 to seal the cylindrical can 300, and may allow current generated from the electrode plate assembly 200 to flow toward an external device. The gasket 500 may be interposed between the cylindrical can 300 and the cap assembly 400. The gasket 500 may be disposed, for example, between an inner wall 300a of an opening of the cylindrical can 300 and the cap assembly 400. The gasket 500 may react with the electrolyte, producing an adhesive material, thereby improving the sealing capacity of the cylindrical can 300.

The electrode assembly 200 may be formed by winding a positive electrode plate 210, a negative electrode plate 220, and a separator 230, in a jelly-roll configuration. The positive electrode plate 210 may include a positive current collector. The negative electrode plate 220 may include a negative current collector. The positive electrode plate 210 may include a positive electrode active material that is coated or disposed on a surface of the positive current collector. The negative electrode plate 220 may include a negative electrode active material that is coated or disposed on a surface of the negative current collector. For example, one or more surfaces of the positive current collector may be coated with the positive electrode active material and one or more surfaces of the negative current collector may be coated with the negative electrode active material. The positive current collector may be made of a metal foil having excellent conductivity, for example, an aluminum (Al) foil or other suitable metal foil. The positive electrode active material layer may be coated or disposed on both surfaces of the positive current collector. A positive current collector portion without the positive electrode active material layer, that is, a positive electrode uncoated portion, may be formed at opposite ends of the positive electrode plate 210. A positive electrode tab 215, which may generally be made of aluminum (Al), may protrude or extend to a top portion of the electrode assembly 200 by a predetermined length. The positive electrode tab 215 may be welded to one end of the positive electrode uncoated portion.

The negative current collector may be made of a conductive metal foil, for example, a copper (Cu) or nickel (Ni) foil, or other suitable metal foil. The negative electrode active material layer may be coated or disposed on both surfaces of the negative current collector. A negative current collector portion without the negative electrode active material layer, that is, a negative electrode uncoated portion, may be formed at opposite ends of the negative electrode plate 220. A negative electrode tab 225, which may generally be made of nickel (Ni), may protrude or extend to a bottom portion of the electrode assembly 200 by a predetermined length. The negative electrode tab 225 may be welded to one end of the negative electrode uncoated portion.

The electrode assembly 200 may further include insulation plates 241 and 245 formed at its top and bottom portions, respectively. The insulation plates 241 and 245 may prevent the electrode assembly 200 from contacting the cap assembly 400 or the cylindrical can 300. The separator 230 may be interposed between the positive electrode plate 210 and the negative electrode plate 220 to insulate the positive electrode plate 210 and the negative electrode plate 220 from each other. The separator 230 may be formed, e.g., of polyethylene (PE), polypropylene (PP), or a composite film of PE and PP. The separator 230 may preferably be wider than the positive electrode plate 210 and the negative electrode plate 220, in order to prevent electrical short from occurring between the positive electrode plate 210 and the negative electrode plate 220.

The cylindrical can 300 may include a cylindrical side surface 310 having opposing upper and lower open ends and a bottom plate 320 extending across a lower open end of the cylindrical side surface 310. The cylindrical side surface 310 may have a predetermined diameter to form a predetermined space in which the cylindrical electrode assembly 200 can be housed. The bottom plate 320 may seal the lower open end of the cylindrical side surface 310. For example, the cylindrical side surface 310 and bottom plate 320 may form a hollow housing in which the electrode assembly 200 may be retained. The upper open end of the cylindrical side surface 310 may include an opening large enough to allow the electrode assembly 200 to be received or inserted in the cylindrical can 300. According to an embodiment, the negative electrode tab 225 of the electrode assembly 200 may be adhered to a center of the bottom plate 320 of the cylindrical can 300, and the cylindrical can 300 itself may serve as a negative electrode. In addition, the cylindrical can 300 may generally be, e.g., aluminum (Al), iron (Fe), or an alloy thereof. Further, the cylindrical can 300 may include a crimping part 330 inwardly bent from its top end to compress a top portion of the cap assembly 400. The cap assembly 400 may be coupled to the upper open end of the cylindrical side surface 310. In addition, the cylindrical can 300 may further include an inwardly recessed beading part 340 that may be downwardly spaced apart from the crimping part 330, or disposed below the crimping part 330, by a distance corresponding to a thickness of the cap assembly 400. The recessed beading part 340 may compress the bottom portion of the cap assembly 400.

The cap assembly 400 may include an upper cap 410, a safety vent 420, an insulator 430, a lower cap 440, and a current interrupting part 450.

The upper cap 410 may be placed in and coupled to a topmost portion of the cap assembly 400. The upper cap 410 may transmit the current generated from the cylinder type lithium secondary battery 100 to the outside. A central portion of the upper cap 410 may protrude to be upwardly convex. For example, the central portion of the upper cap 410 may be raised or extended a predetermined distance above opposing ends of the upper cap 410.

The safety vent 420 may be made of a conductive material and manufactured or formed in a disk shape. The safety vent 420 may preferably be made of, e.g., aluminum (Al) or nickel (Ni). The safety vent 420 may have a protrusion 420a formed at its center that protrudes downwardly and is positioned at the bottom portion of the cap assembly 400. For example, the safety vent 420 may generally extend horizontally between opposing ends of the cap assembly 400. The safety vent 420 may include opposing end portions that are vertically aligned with opposing ends of the upper cap 410. The protrusion 420a may extend below the opposing end portions of the safety vent 420. The protrusion 420a may be upwardly deformed due to an internal pressure of the cylinder type lithium secondary battery 100. For example, the protrusion 420a may be configured to deform and bend upwards in response to a predetermined rise in internal pressure of the cylinder type lithium secondary battery 100.

The positive electrode tab 215 may be drawn out or extended from one of the positive and negative electrode plates 210 and 220 of the electrode assembly 200 in response to the rise in internal pressure of the cylinder type lithium secondary battery 100. The current interrupting part 450 may then be ruptured or deformed in response to movement of the positive electrode tab 215. For example, the positive electrode tab 215 may be welded to a predetermined location or position of a bottom surface of the safety vent 420, e.g., to the protrusion 420a of the safety vent 420 via the current interrupting part 450. In this manner, the safety vent 420 and the positive electrode plate 210 of the electrode assembly 200 may be electrically connected to each other via the positive electrode tab 215 and the current interrupting part 450. Here, the other of the positive electrode plate 210 and the negative electrode plate 220, for example, the negative electrode plate 220, may be electrically connected to the cylindrical can 300 through a tab (not shown) or in a direct contact manner. When the internal pressure of the cylindrical can 300 increases, the safety vent 420 may be deformed or ruptured, so that the current interrupting part 450 is broken.

The insulator 430 may be interposed between the safety vent 420 and the lower cap 440 to insulate the safety vent 420 and the lower cap 440 from each other.

The lower cap 440 may be formed or manufactured in a disk shape. A throughhole 440a may be formed in a center of the disk-shaped lower cap 440 so that the protrusion 420a of the safety vent 420 protrudes downwardly through the throughhole 440a.

The current interrupting part 450 may be made of a conductive material and may be attached to a bottom surface of the lower cap 440. The protrusion 420a of the safety vent 420 may be attached to a top surface of the current interrupting part 450, and the positive electrode tab 215 may be electrically connected to the bottom surface of the current interrupting part 450, to then be fixed. The protrusion 420a of the safety vent 420 may be attached to the top surface of the current interrupting part 450 through the throughhole 440a of the lower cap 440.

The gasket 500 may generally be in the shape of a circular ring having a top portion, a bottom portion, an opening defined in each of the top and bottom portions, and a predetermined height. The gasket 500 may be inserted in the cylindrical can 300 through the top portion of the cylindrical can 300 and may be placed in or supported by the beading part 340. In addition, the cap assembly 400 may be inserted into the gasket 500 to be placed in the cylindrical can 300. Therefore, the gasket 500 may be positioned between the cap assembly 400 and the cylindrical can 300 and, thereby, seal a gap between the cap assembly 400 and the inner wall of the cylindrical can 300.

Figure 3A:
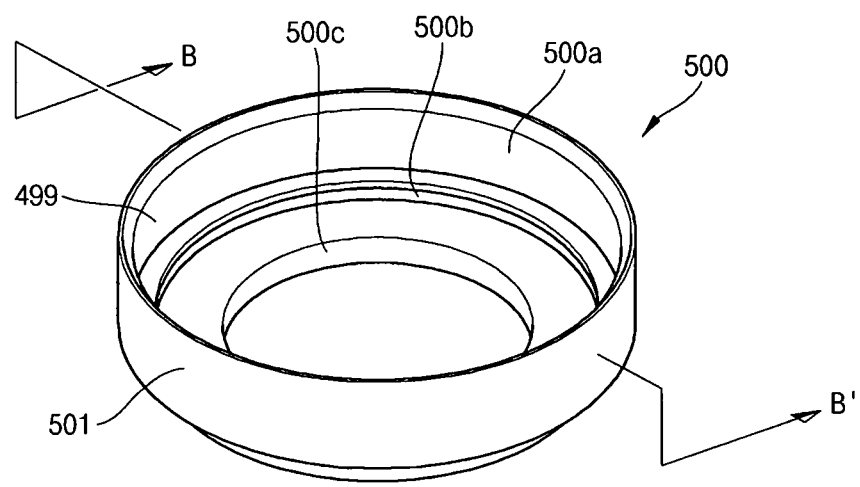
FIG. 3A illustrates a perspective view of a gasket according to an embodiment.
Figure 3B:
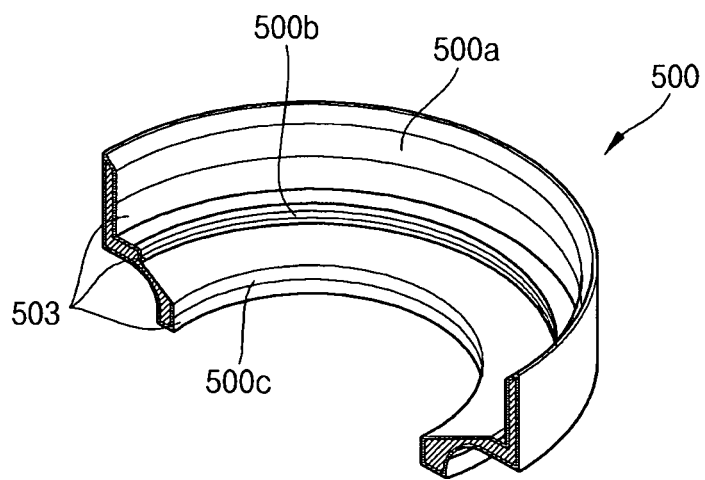
FIG. 3B is a sectional view taken along the line B-B' of FIG. 3A.
Figure 4:
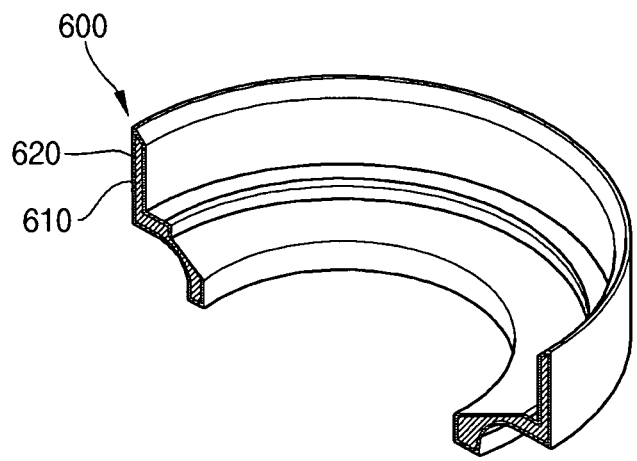
FIG. 4 illustrates a sectional view corresponding to FIG. 3B, illustrating a gasket according to another embodiment.
Figure 5:
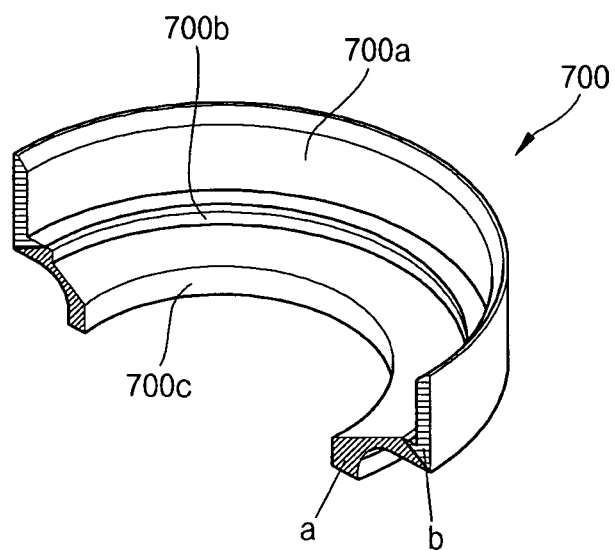
FIG. 5 illustrates a sectional view corresponding to FIG. 3B, illustrating a gasket according to still another embodiment.

FIG. 3A is a perspective view of a gasket according to an embodiment, and FIG. 3B is a sectional view taken along the line B-B' of FIG. 3A. FIG. 4 is a sectional view corresponding to FIG. 3B, illustrating a gasket according to another embodiment, and FIG. 5 is a sectional view corresponding to FIG. 3B, illustrating a gasket according to still another embodiment.

Referring to FIG. 3A, the gasket 500 may include a top portion 500a, a mid portion 500b, and a bottom portion 500c. The mid portion 500b may extend from lower end $500a^1$ of the top portion. The mid portion 500b may have top surface $500b^1$ contacting a bottom edge 400a of the cap assembly 400. The bottom portion 500c may extend from a lower end $500b^{11}$ of the mid portion 500b. However, the gasket 500 may have various shapes according to the shapes and connection mechanism of the cap assembly 400 and the cylindrical can 300 in a cylinder type secondary battery. For example, the gasket 500 may be configured to have any shape that would facilitate coupling of the gasket 500 with the cap assembly 400 and the cylindrical can 300.

Referring to FIGS. 3A and 2, the gasket may include an inner surface 499 and an outer surface 501. The inner surface 499 may face the cap assembly 400 and the outer surface 501 may face the inner wall of the cylindrical can 300, once the gasket 500 is inserted into the cylindrical can 300. The top portion 500a of the gasket 500 may have a predetermined height in a vertical direction, and may be positioned between a lateral surface of the cap assembly 400 and the inner wall of the cylindrical can 300. For example, the top portion 500a may include an upright wall that is disposed between a side surface of the cap assembly 400 and the inner wall of the cylindrical can 300. In addition, the top portion 500a may come into contact with a top surface of the cap assembly 400 when a top end of the top portion 500a is crimped with a top end of the cylindrical can 300. For example, the top portion 500a may contact both the crimping part 330 of the cylindrical can 300 and the top surface of the cap assembly 400 when inserted into the cylindrical can 300. Therefore, the top portion 500a of the gasket 500 may contact the side and top surface of the cap assembly 400.

The mid portion 500b of the gasket 500 may extend from a bottom end of the top portion 500a in a horizontal direction. The mid portion 500b may, for example, have a horizontal wall that intersects the upright wall of the top portion 500a at an angle of between about 50 degrees to about 100 degrees. A bottom periphery of the cap assembly 400 may contact the top surface of the mid portion 500b to allow the cap assembly 400 to be placed on or supported by the gasket 500. For example, the cap assembly 400 may be positioned or seated on the mid portion 500b. In addition, a bottom surface of the horizontal wall of the mid portion 500b may come into contact with the beading part 340 of the cylindrical can 300. Therefore, the mid portion 500b may seal a gap between the bottom periphery of the cap assembly 400 and the beading part 340 of the cylindrical can 300.

The bottom portion 500c may extend downwardly from a bottom end of the mid portion 500b. The beading part 340 of the cylindrical can 300 may prevent the bottom portion of the cap assembly 400 and the positive electrode tab 215 from electrically contacting each other.

The gasket 500 may be made of oriented polystyrene (OPS). The OPS may react with an electrolyte due to a contact with the electrolyte, so that a surface of the gasket 500 becomes adhesive. For example, an adhesive may be produced on the surface of the gasket 500 when the gasket 500 is exposed to the electrolyte. Therefore, the gasket 500 may have an adhesive layer 503 due to the electrolyte induced to or contacted with the bottom and side surfaces of the cap assembly 400 or between the inner wall of the cylindrical can 300 and the beading part 340. That is to say, as the electrolyte comes into contact with opposing side surfaces of the top portion 500a, opposing side surfaces of the mid portion 500b, and opposing side surfaces of the bottom portion 500c, the adhesive layer may be formed on the gasket 500 between, e.g., a surface of the gasket 500 facing the cap assembly 400 and the cap assembly 400. Therefore, the gasket 500 has an increased sealing capacity, or provides a tight seal, between the surface of the gasket 500 and the bottom and side surfaces of the cap assembly 400, or between the inner wall of the cylindrical can 300 and the beading part 340, thereby minimizing the electrolyte from being additionally induced and/or minimizing leakage of the electrolyte. In addition, in a case where the electrolyte is additionally induced or electrolyte leakage occurs, the sealing capacity of the gasket 500 may increase, as the adhesive layer may continuously form throughout a region where the electrolyte flows. In other words, continuous contact of the gasket 500 with the electrolyte may continuously increase the thickness of the adhesive layer 503 on the gasket 500. For example, an entire thickness of the gasket 500 between the cap assembly 400 and the cylindrical can 300 may become adhesive.

Meanwhile, the gasket 500 may be inserted into the cylindrical can 300 such that it is impregnated into or with the electrolyte, or the electrolyte is coated on its surface. For example, the gasket 500 may have the adhesive layer 503 disposed on its entire inner surface, so the entire inner surface of the gasket 500 is adhered to the cap assembly 400 via the adhesive layer 503, and the outer surface of the gasket 500 is on the inner wall of the cylindrical can 300, thereby increasing the sealing capacity.

Referring to FIG. 4, a gasket 600 according to another embodiment may include a body 610 made of a conventional material, such as polypropylene, and a coating layer 620 formed by coating OPS on a surface of the body 610. An adhesive layer may be formed on the gasket 600 when the coating layer 620 formed thereon comes into contact with an electrolyte. Accordingly, the gasket 600 may have an increased sealing capacity as its outer surface having the adhesive layer is adhered to a cap assembly 400 and an inner wall of a cylindrical can 300, like the gasket 500 formed of OPS according to the previous embodiment, shown in FIGS. 1 to 3B.

Alternatively, in a gasket 700 according to another embodiment illustrated in FIG. 5, a portion (a) of the gasket 700 contacting an electrolyte may be made of OPS. A portion (b) of the gasket 700 not contacting the electrolyte may be made of polypropylene.

The gasket 700 may be assembled with or coupled to a can (300 of FIG. 2) together with a cap assembly (400 of FIG. 2). Here, the portion (a) contacting the electrolyte may include a portion directly exposed to the electrolyte and a portion directly contacting the electrolyte induced or introduced between the gasket 700 and the cap assembly 400 or between the gasket 700 and the can 300. For example, in the gasket 700, as shown in FIG. 5, a bottom portion 700c, contacting the electrolyte, and a portion of a mid portion 700b, may be made of OPS. A portion of the mid portion 700b, not contacting the electrolyte, and a top portion 700a, may be made of a conventional material such as polypropylene. Therefore, the gasket 700 may include an adhesive layer formed at a portion directly contacting the electrolyte, and a portion exposed to the electrolyte that is induced or introduced between the gasket 700 and the cap assembly 400 and between the gasket 700 and an inner wall of the cylindrical can 300. The adhesive layer formed in this manner, may increase a sealing capacity between the gasket 700 and the cap assembly 400 and between the gasket 700 and the cylindrical can 300.

The electrolyte may include OPS and a nonaqueous or nonpolar organic solvent reacting with polystyrene. The electrolyte preferably includes carbonates. Examples of the carbonates may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Particularly, the electrolyte may include a nonaqueous or nonpolar organic solvent, for example, at least one of dimethyl carbonate (DMC), diethyl carbonate (DEC), and dipropyl carbonate (DPC).

Hereinafter, example embodiments will be described in more detail through detailed examples for sealing capacity tests. However, the following examples are provided only for a better understanding, and example embodiments are not limited thereto.

The sealing capacity tests were carried out using the cylinder type secondary batteries shown in FIGS. 1 and 2. In the cylinder type secondary battery according to a comparative example, a conventional gasket made of polypropylene coated with tar was used. In the cylinder type secondary battery according to example embodiments, a gasket made of OPS was used. In addition, a current interruption device having an operating pressure of 15 kgf and a rupture pressure of 30 kgf was installed in each cylinder type secondary battery tested. Here, the operating pressure means a pressure at which a safety vent of a cap assembly is separated from the current interruption device, and the rupture pressure means a pressure at which the safety vent is ruptured.

The sealing capacity was tested by evaluating each of 10 cylinder type secondary batteries according to Comparative Examples and Examples (example embodiments) in view of operating pressure, sealing pressure, and rupture state. Here, the sealing pressure means a pressure at which leakage of nitrogen gas through a cap assembly starts. The rupture state means a state indicating whether the safety vent of the current interruption device constituting or included in the cap assembly, is ruptured or not. In a case where the safety vent is ruptured, nitrogen gas is leaked through a ruptured portion of the safety vent. The operating pressure, the sealing pressure and the rupture state were evaluated by injecting nitrogen gas into the battery tested while increasing the internal pressure of the battery. Here, the nitrogen gas was injected at a rate that allowed the internal pressure to increase by 1 $kgf/cm^2$ per 10 seconds.

The test results are shown below in Table 1. As confirmed by the results shown in Table 1, the cylinder type secondary batteries according to Comparative Examples had the average operating pressure of approximately 14.5 $kgf/cm^2$. The cylinder type secondary batteries according to Examples (embodiments) had the operating pressure of approximately 15 $kgf/cm^2$, which is similar to the average operating pressure of the cylinder type secondary batteries according to Comparative Examples. Therefore, it is understood that the cylinder type secondary batteries according to Comparative Examples and Examples (embodiments) were maintained at normally sealed states until the operating pressures were reached.

The cylinder type secondary batteries according to Comparative Examples had the average sealing pressure of approximately 16 $kgf/cm^2$. The cylinder type secondary batteries according to Examples (embodiments) had the sealing pressure of approximately 29 $kgf/cm^2$, which is generally higher than the average sealing pressure of the cylinder type secondary batteries according to Comparative Examples. In addition, since the cylinder type secondary batteries according to Comparative Examples demonstrated unsealed states before they reached the rupture pressure, the safety vent of each battery was not ruptured. By contrast, the cylinder type secondary batteries according to Examples (embodiments) maintained sealed states until some of them reached the rupture pressure, leading to ruptures of safety vents. Therefore, it is understood that the cylinder type secondary batteries according to Examples (embodiments) exhibit improved performance compared to the performance of the cylinder type secondary batteries according to Comparative Examples, in view of sealing capacity.

TABLE 1

| | Comparative Example (Tar coated gasket) | | | Example (OPS gasket) | | |
|---|---|---|---|---|---|---|
| Sample No. | Operating pressure | Sealing Pressure | Rupture | Operating pressure | Sealing Pressure | Rupture |
| 1 | 14.30 | 16.40 | X | 15.40 | 29.80 | ○ |
| 2 | 14.40 | 17.50 | X | 15.20 | 29.70 | ○ |
| 3 | 14.30 | 17.40 | X | 15.00 | 23.20 | X |
| 4 | 14.20 | 15.00 | X | 14.40 | 23.90 | X |
| 5 | 14.50 | 15.20 | X | 14.80 | 29.60 | ○ |
| 6 | 14.30 | 17.40 | X | 15.00 | 23.20 | X |
| 7 | 14.50 | 15.00 | X | 15.50 | 29.80 | ○ |
| 8 | 15.00 | 15.20 | X | 14.50 | 29.50 | ○ |
| 9 | 15.00 | 16.20 | X | 15.00 | 24.30 | X |
| 10 | 14.20 | 14.50 | X | 14.80 | 24.90 | X |

As described above, in the cylinder type lithium secondary battery according to an embodiment, the sealing capacity of a gasket may be improved by forming an adhesive layer by contacting an electrolyte to a surface of the gasket. In contrast, as a use time of a conventional secondary battery, i.e., a secondary battery without the adhesive layer on the gasket, is extended or an internal pressure of the secondary battery increases, a sealing capacity of the conventional gasket with respect to the cap assembly or the cylindrical can may be lowered. If the sealing capacity of the gasket is lowered, the cylinder type lithium secondary battery may undergo leakage of electrolyte between the cap assembly and the gasket or between the gasket and the cylindrical can.

Although a lithium secondary battery including a cylindrical can has been described, it should be understood that the present teachings are not limited to a can having a cylindrical shape. The lithium secondary battery may have other shapes, e.g., a hexagonal shape or any other suitable shape.

Example embodiments have been disclosed herein, and although specific terms are employed, e.g., cylindrically-shaped batteries, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A lithium secondary battery, comprising:
an electrode assembly;
a cylindrical can configured to retain the electrode assembly;
a cap assembly coupled to a top opening of the cylindrical can;
an electrolyte disposed in the cylindrical can; and
a gasket between the cap assembly and the cylindrical can,
wherein the gasket, an entire thickness of which is a reaction product of the electrolyte and oriented polystyrene, contacts bottom and side surfaces of the cap assembly and contacts the cylindrical can, and
wherein the electrolyte includes a carbonate.

2. The lithium secondary battery as claimed in claim 1, wherein the gasket includes a top portion positioned between the cap assembly and an inner wall of the cylindrical can, a mid portion horizontally extending from a lower end of the top portion, the mid portion having a top surface contacting a bottom edge of the cap assembly seated thereon, and a bottom portion extending from a lower end of the mid portion.

3. The lithium secondary battery as claimed in claim 2, wherein the top portion, the mid portion, and the bottom portion of the gasket include oriented polystyrene.

4. The lithium secondary battery as claimed in claim 2, wherein a portion of the gasket contacting the electrolyte includes the bottom portion and a portion of the gasket not contacting the electrolyte includes the top portion.

5. The lithium secondary battery as claimed in claim 2, wherein the electrolyte contacts the bottom and side surfaces of the cap assembly or contacts the inner wall of the cylindrical can and a beading part.

6. The lithium secondary battery as claimed in claim 1, wherein the electrolyte contacts a surface of the gasket.

7. The lithium secondary battery as claimed in claim 1, wherein the gasket has a sealing pressure of about 23.00 kgf/cm$^2$ or higher.

8. The lithium secondary battery as claimed in claim 7, wherein the gasket has a sealing pressure of about 29.000 kgf/cm$^2$.

9. The lithium secondary battery as claimed in claim 1, wherein the electrolyte includes dimethyl carbonate, diethyl carbonate, or dipropyl carbonate.

10. The lithium secondary battery as claimed in claim 1, wherein the gasket is configured to support the cap assembly in the cylindrical can.

11. The lithium secondary battery as claimed in claim 1, wherein the electrolyte includes methylpropyl carbonate ethylpropyl carbonate, or dipropyl carbonate.

12. The lithium secondary battery as claimed in claim 1, wherein the electrolyte includes oriented polystyrene.

* * * * *